UNITED STATES PATENT OFFICE.

ANTONIO BUZOLICH, OF NORTH CARLTON, AND T. KING SMITH, OF PRAHRAN, VICTORIA.

PAINT.

SPECIFICATION forming part of Letters Patent No. 291,678, dated January 8, 1884.

Application filed October 11, 1883. (No specimens.)

*To all whom it may concern:*

Be it known that we, ANTONIO BUZOLICH and THOMAS KING SMITH, subjects of the Queen of Great Britain, residing, respectively, at Nicholson street, North Carlton, in the British colony of Victoria, decorator, and at Hoddle street, Prahran, in said colony, manufacturing chemist, have invented an improved composition to be used, either with or without ordinary pigments, as a paint antagonistic to parasitic life, either animal or vegetable.

The foundation compound wherewith we prefer to embody the chemical constituents which produce the poisonous qualities herein set out has a basis of linseed or nut oil, and is described, with the method of compounding it, in our application for Letters Patent filed September 19, 1882, the serial number being 71,969, to which reference is hereby made for purposes of information.

To each gallon of our paint compound we add one-quarter of an ounce of chrysophanic acid, or an ounce and a half of common sulphuric acid, and then filter. The mixture is then heated to a temperature within 15° of the boiling-point, and a solution of fourteen (14) ounces ordinary white vitriol and the same quantity of ordinary blue vitriol, and seven ounces of chromate of potash are added.

After the mixture becomes cold, it is passed through a common sieve and it is ready for use.

Having described our poisonous paint, what we claim as new is—

A paint composition the basis whereof is linseed or nut oil combined with chrysophanic acid, sulphate of zinc, sulphate of copper, and chromate of potash, substantially as set forth.

ANTONIO BUZOLICH.
T. KING SMITH.

Witnesses:
EDWARD WATERS,
WALTER SMYTHE BAYSTON.